United States Patent [19]

Kondo et al.

[11] 3,997,043
[45] Dec. 14, 1976

[54] POWER TRANSMISSION DEVICE IN MOTOR VEHICLE

[75] Inventors: Makoto Kondo; Kuniyuki Yamamoto, both of Saitama, Japan

[73] Assignee: Honda Giken Kogyo Kabushiki Kaisha, Tokyo, Japan

[22] Filed: Sept. 4, 1975

[21] Appl. No.: 610,227

[30] Foreign Application Priority Data

Sept. 5, 1974 Japan .............................. 49-107015

[52] U.S. Cl. .................................. 192/55; 74/359
[51] Int. Cl.² ...................... F16D 7/00; F16H 3/08
[58] Field of Search ..................... 192/55, 54, 56 R; 74/359

[56] References Cited

UNITED STATES PATENTS

| 3,545,585 | 12/1970 | Eaton, Jr. .................. | 192/55 X |
| 3,880,267 | 4/1975 | Auble et al. .................. | 192/55 X |

*Primary Examiner*—Leonard H. Gerin
*Attorney, Agent, or Firm*—Polster and Polster

[57] ABSTRACT

Improvement in a power transmission system in a motor vehicle which comprises a clutch associated with a crank shaft of an engine, a group of power transmission gears, an output shaft for the power transmission gears, a driving gear mounted on the output shaft, a propeller shaft, a universal joint for joining both output shaft and propeller shaft at their respective end parts, a set of final speed reduction gears, wherein there is provided a buffer means for preventing said output shaft for the transmission system and the propeller shaft connected therewith from becoming overloaded, the buffer means being mounted on one part of the output shaft and constructed with a pair of cam pawls, one of the cam pawls being mounted on the output shaft integrally with the driving gear, and the other cam pawl being spline-connected on the output shaft, and a compression spring to effect engagement between the pair of cam pawls.

3 Claims, 2 Drawing Figures

POWER TRANSMISSION DEVICE IN MOTOR VEHICLE

BACKGROUND OF THE INVENTION a. Field of the Invention

This invention relates to a power transmission device for wheels to be driven in motor vehicles such as motorcycle, automobiles, and so forth. More particularly, it is concerned with a device for preventing the drive shaft from being overloaded, thereby attaining equalized distribution in weight to be imposed on the drive shaft.

b. Description of Prior Art

It has been deemed necessary to provide on the propeller or drive shaft in the power transmission device for such motor vehicles a buffer device for preventing the propeller shaft from becoming overloaded so as to relax excessive impact force to be imposed on the power transmission mechanism at the time of speed changing, abrupt braking operation, and so forth.

In the case of a motorcycle driven by a drive shaft, or an automobile of a front-engine-rear-drive type, however, when such buffer device is provided in the intermediate portion of the propeller shaft in view of the length of the shaft, there would occur an inconvenience such that, as the buffer device is of a considerable weight, distribution of weight on the propeller shaft becomes difficult, and, further, the shaft is subjected to flexure due to centrifugal action accompanied by the shaft rotation. Moreover, an additional space is required around the propeller shaft for fitting the buffer device, which constitutes an obstacle against the desired compact design of the vehicle body.

SUMMARY OF THE INVENTION

It is therefore an object of the present invention to provide a power transmission device, in which the abovementioned inconveniences and difficulties are completely eliminated.

That is, according to the present invention, there is provided an improved power transmission system in a motor vehicle which comprises a clutch associated with a crank shaft of an engine, a group of power transmission gears, an output shaft for the power transmission gears, a driving gear mounted on the output shaft, a propeller shaft, a universal joint for joining both output shaft and propeller shaft at their respective end parts, a set of final speed reduction gears, wherein there is provided a buffer means for preventing said output shaft for the transmission system and the propeller shaft connected therewith from becoming overloaded.

The foregoing object and other objects as well as the actual construction and function of the present invention will become more readily understandable from the following detailed description of the invention, when read in conjunction with the accompanying drawing.

DETAILED DESCRIPTION OF A PREFERRED EMBODIMENT

Figure 1:
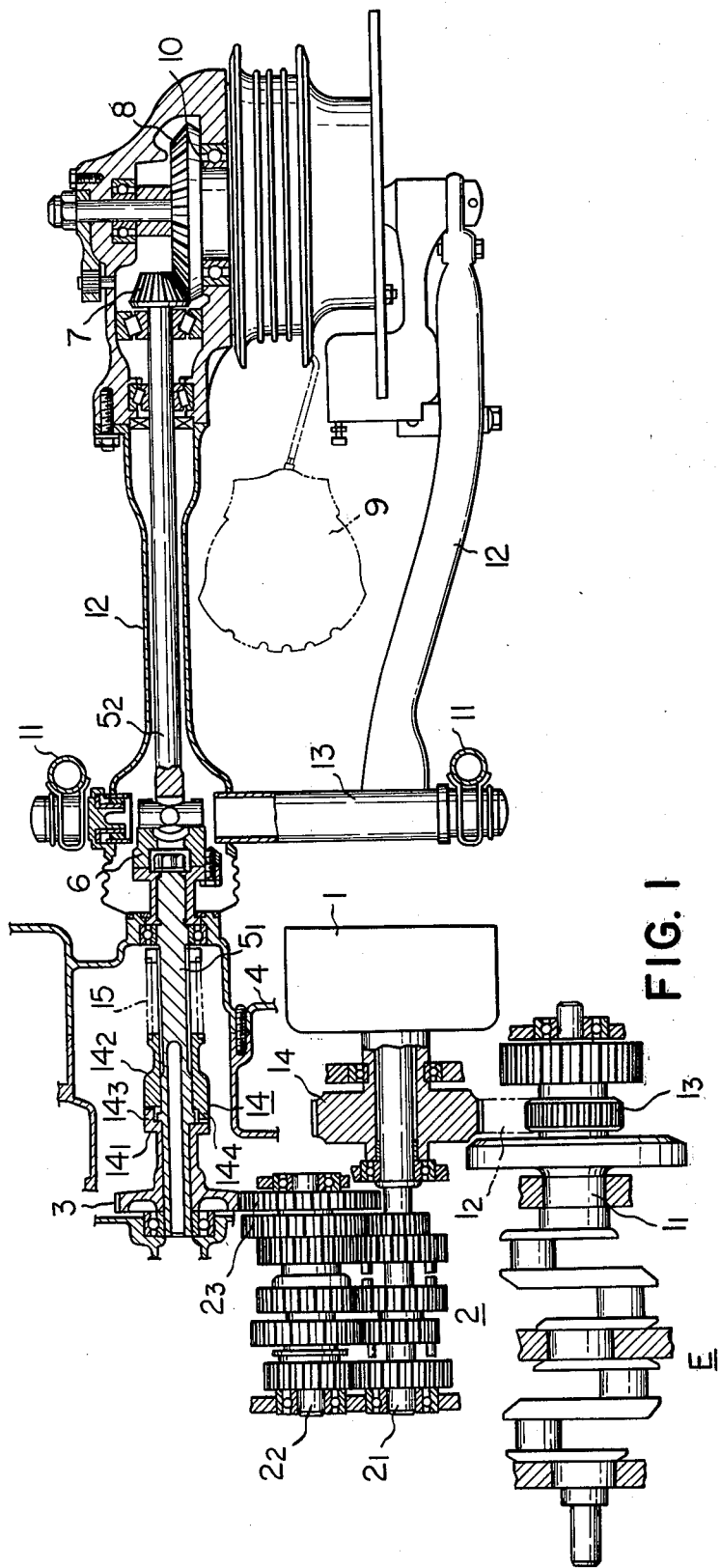
FIG. 1 is a plan view partly in longitudinal cross-section showing a preferred embodiment of the power transmission device applied to a motorcycle drive by a drive shaft.
Figure 2:
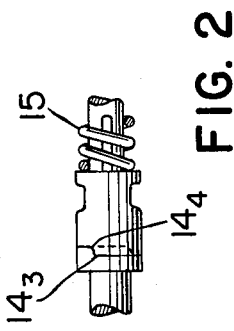
FIG. 2 is a fragmentary plan view of buffer device shown in FIG. 1.

Referring now to the drawing, the power transmission mechanism for the motorcycle as one example, driven by a drive shaft and the related structure thereof basically comprises a crank shaft $1_1$ of an engine E, a driving chain $1_2$ engaged with a sprocket wheel $1_3$ mounted on one end of the crank shaft $1_1$ and a first speed reduction sprocket wheel $1_4$ provided with a clutch 1, a main shaft $2_1$ associated with a clutch 1, a counter shaft $2_2$, a group of power transmission gears 2 mounted on the main shaft $2_1$ and the counter shaft $2_2$, a driving gear 3 engaged with a final drive gear $2_3$ of the group of transmission gears 2, a driving gear 3, a casing 4 for the power transmission mechanism 2, an output shaft $5_1$ for the power transmission mechanism, a propeller or drive shaft $5_2$, a universal joint 6 for joining both output shaft and propeller shaft at their respective end parts, a set of final speed reduction (or differential) gears 7 and 8, a wheel 9 to be driven, a drive coupling 10 for the wheel 9, a vehicle body frame 11, a rear fork, or a swing arm, 12 which supports the wheel 9 and covers the propeller shaft $5_2$, and a shaft 13 for oscillating the rear fork in the up-and-down direction.

In the above-described general construction of the motorcycle driven by the drive shaft, a buffer device 14 for preventing the output shaft for the power transmission mechanism from becoming overloaded is provided on one part of the output shaft $5_1$, and this buffer device 14 is covered with a part of the casing 4 for the power transmission system, simultaneously holding both front and rear ends of the output shaft $5_1$ at the casing 4 for the power transmission system.

The buffer device 14 for preventing the overload may be of any appropriate construction including utilization of flexibility of rubber, friction between metal members, and so on. In the illustrated embodiment, this buffer device is of an engaging clutch type. In more detail, one of the flanges $14_1$ is mounted on one end part of the output shaft $5_1$ and made integral with the drive gear 3 by means of a boss therefor, while a boss of the other flange $14_2$ is spline-connected on the other end part of the output shaft $5_1$, whereby cam pawls $14_3$ and $14_4$ of the respective flanges $14_1$ and $14_2$ are constantly engaged each other by the action of a spring 15. In this structure, when an impact load is applied to the buffer device, or the overload preventive clutch, 14 due to a difference in torque between the drive gear 3 and the output shaft $5_1$ and the propeller shaft $5_2$, the cam pawl $14_4$ collides with the cam pawl $14_3$ and escapes backwards (i.e., to the right side as viewed from the top surface of the drawing) along the output shaft $5_1$. At this time, the spring 15 is compressed to relax the impact applied thereto.

As described above, since the present invention provides the buffer device 14 for preventing the output shaft $5_1$ for the power transmission system from becoming overloaded on this output shaft $5_1$, no difficulty arises in weight distribution of the output shaft and the propeller shaft, so that no excessive load is applied to both output shaft $5_1$ and the drive shaft $5_2$ during their rotation.

Moreover, as the overload preventive buffer device 14 according to the present invention is covered with a part of the casing 4 of the power transmission device, lubricating oil accommodated within the casing 4 is splashed on the buffer device 14 in its operation so as to perform both lubrication and cooling thereof. Also, the front and rear end parts of the buffer 14 mounted on the output shaft $5_1$ can be supported by the casing 4 of the power transmission mechanism 2, the weight distribution on the abovementioned output shaft and propeller shaft can be remarkably improved. Although, in the foregoing, the present invention has been described with particular reference to a preferred embodiment thereof, it should be noted that changes and modifications may be made thereto by those skilled in the art without deviating from the spirit and scope of the present invention as set forth in the appended claims.

What is claimed is:

1. In a power transmission system in a motor vehicle which comprises: a clutch associated with a crank shaft of an engine, a group of power transmission gears, an output shaft for said power transmission gears, a driving gear mounted on said output shaft, a propeller shaft, a universal joint for joining both said output shaft and said propeller shaft at their respective end parts, a set of final speed reduction gears, and a protective covering to accommodate said power transmission system therein, an improvement which comprises a buffer means for preventing said output shaft for the power transmission and said propeller shaft connected therewith from becoming overloaded, said buffer means being mounted on one part of said output shaft and covered with a part of said protective covering.

2. The improvement as claimed in claim 1, wherein said overload preventing buffer means comprises a pair of cam pawls, one of said cam pawls being mounted on said output shaft integrally with said driving gear, and the other cam pawl being spline-connected on said output shaft; and a compression spring to effect engagement between said pair of cam pawls.

3. The improvement as claimed in claim 1, wherein said drive shaft transmits driving power to a wheel and is accommodated in a rear fork of said motor vehicle.

* * * * *